ately by a hydraulically operated clutch release cylinder. The range transmission is shiftable into high or low by supplying hydraulic fluid to power shift clutches therein. The main transmission is shiftable into forward, reverse or neutral by manual operation of a direction selector valve. The main transmission is also shiftable into each of its speed ranges by axially moving the spool of a speed selector valve. The spool of the speed selector valve is axially movable into four positions by a hydromechanical linkage comprising three hydraulic shift cylinders.

A fluid logic control system is provided to operate the main engine clutch, the range transmission and the main transmission automatically in a predetermined sequence so as to provide eight speed ranges in either forward or reverse. The control system comprises a high range shifter valve; a low range shifter valve; and an engine clutch sequence valve which operate in concert in response to manual operation of the spool of a speed control valve (having eight speed positions and neutral) to supply fluid to operate the engine clutch release cylinder and the range transmission shift clutches in a predetermined sequence. The three hydraulic shift cylinders are operated by the speed control valve. In accordance with the sequence, the normally engaged main engine clutch is automatically disengaged while either of the transmissions is undergoing a shifting operation so as to provide for smoother shifting and to relieve loads on the power shift clutches in the transmission. Furthermore, the range transmission automatically shifts twice (high and low) in each of the four speed ranges of the main transmission to provide a total of eight possible speed ranges.

10 Claims, 9 Drawing Figures

---

United States Patent [19]
McRay

[11] 3,944,035
[45] Mar. 16, 1976

[54] FLUID CONTROL SYSTEM FOR HYDRAULICALLY OPERATED TRANSMISSIONS AND MASTER CLUTCH

[75] Inventor: Ferris L. McRay, Springfield, Ill.

[73] Assignee: Fiat-Allis Construction Machinery, Inc., Deerfield, Ill.

[22] Filed: Oct. 16, 1974

[21] Appl. No.: 515,315

[52] U.S. Cl. .................. 192/3.57; 91/413; 60/484; 74/745
[51] Int. Cl.² ........................................ B60K 21/00
[58] Field of Search ...................... 192/3.57; 74/745

[56] References Cited
UNITED STATES PATENTS

| | | | |
|---|---|---|---|
| 3,292,751 | 12/1966 | McRay et al. | 192/3.57 |
| 3,459,285 | 8/1969 | Lamburn et al. | 192/3.57 |
| 3,548,981 | 12/1970 | Hill et al. | 192/3.57 |
| 3,675,508 | 7/1972 | Blank | 74/745 |
| 3,783,985 | 1/1974 | May | 192/3.54 |

*Primary Examiner*—Benjamin W. Wyche

[57] ABSTRACT

The power train between the engine and drive wheels of a motor grader, for example, comprises a normally engaged main engine clutch, a high-low power shift range transmission, and a four speed reversible power shift main transmission. The main engine clutch is releasable manually by a clutch pedal or releasable auto-

| TRANSMISSION SHIFT SEQUENCE IN FORWARD | | |
|---|---|---|
| TRANSMISSION SELECTOR SPOOL POSITION | SHIFTER CLUTCHES ENGAGED | |
| | HI-LO RANGE TRANS. | MAIN TRANS. |
| NEUTRAL | | 1st |
| 1st FWD | LOW | 1st AND FWD |
| 2nd FWD | HIGH | 1st AND FWD |
| 3rd FWD | LOW | 2nd AND FWD |
| 4th FWD | HIGH | 2nd AND FWD |
| 5th FWD | LOW | 3rd AND FWD |
| 6th FWD | HIGH | 3rd AND FWD |
| 7th FWD | LOW | 4th AND FWD |
| 8th FWD | HIGH | 4th AND FWD |

FLUID CONTROL SYSTEM FOR HYDRAULICALLY OPERATED TRANSMISSIONS AND MASTER CLUTCH

BACKGROUND OF THE INVENTION

1. Field of Use

This invention relates generally to a control system for hydraulically controlled components in the power train between the engine and the drive wheels of a motor grader. More specifically, the invention relates to a fluid logic control system for operating a main engine clutch, a high-low range transmission and a multispeed main transmission in the drive train in a predetermined sequence in response to actuation of a speed range control valve to provide an increased number of possible speed ranges and improved transition between speed ranges.

2. Description of the Prior Art

In order to provide a desired number of speed ranges for the output shaft of a power train it was fromerly the practice either to employ a single transmission designed to provide the necessary number of speed ranges or to employ a low speed-high speed range transmission in combination with a multispeed main transmission and controls for operating the two transmissions in a sequence which provided the desired number of shift ranges. Some prior art control means required the operator to actuate separate controls to operate the two transmissions and the main engine clutch, but such arrangements were mechanically complex and required a high degree of operator skill and attention to achieve smooth and efficient shifting. Other prior art control means designed to operate the two transmissions in a predetermined sequence relied on mechanical arrangements which were not wholly dependable, required repeated adjustment and were not fully automatic but required additional operator input to carry out a proper shifting sequence.

SUMMARY OF THE PRESENT INVENTION

In accordance with the invention the power train between the engine and drive wheels of a motor grader, for example, comprises a normally engaged main engine clutch, a high-low power shift range transmission, and a four speed reversible power shift main transmission. The main engine clutch is operated by a movable clutch control lever which is actuatable automatically by a hydraulically operated clutch release cylinder or manually by means of a clutch pedal. The range transmission is shiftable by supplying hydraulic fluid to either of its two (high-low) power shift clutches. The main transmission is shiftable into forward, reverse or neutral by manual operation of the spool of a direction selector valve. The main transmission is also shiftable into any one of its four speed ranges by operation of the spool of a speed selector valve. The spool of the speed selector valve is operated by a linkage comprising three hydraulic shift cylinders.

A fluid logic control system is provided to operate the main engine clutch, the range transmission and the main transmission automatically in a predetermined sequence so as to provide eight speed ranges in either forward or reverse. The control system comprises a source of hydraulic fluid; a manually operable eight-position speed control valve; a high range shifter valve; a low range shifter valve; an engine clutch sequence valve; and pressure regulating valves. The shifter valves and engine clutch sequence valve operate in concert in response to manual operation of the speed control valve to supply fluid to operate the engine clutch release cylinder and the range transmission shift clutches in a predetermined sequence. The three hydraulic shift cylinders are operated by the speed control valve. In accordance with the sequence, the normally engaged main engine clutch is automatically disengaged while either of the transmissions is undergoing a shifting operation so as to provide for smoother shifting and to relieve loads on the power shift clutches in the transmissions. Furthermore, the range transmission automatically shifts twice (high and low) in each of the four speed ranges of the main transmission to provide a total of eight possible speed ranges.

A control system in accordance with the invention offers several advantages over prior art arrangements. For example, the system provides for a substantial increase in the possible number of speed ranges available without the necessity to modify, rebuild or redesign commercially available transmissions or clutches. Furthermore, the system provides for automatic smooth operation of the clutch and the two transmissions. In addition, operation of the two transmissions and the main engine clutch is carried out by means of a single control lever and eliminates the need to employ individual control levers for each transmission and for the clutch, although provision is made for selective main clutch operation under certain circumstances, such as when the operator is shifting from neutral into the first speed range and desires to exercise manual control of the initial movements of the machine. Another important advantage is that the main engine clutch, which is larger than the individual power shift clutches inside the transmissions, is automatically disengageable before and does not re-engage until after the power shift clutches in the transmissions have shifted. As a result, the larger main clutch absorbs the heavy load of initial machine movement and the life of the relatively smaller power shift clutches is extended. Also, the main engine clutch remains engaged when the system is in neutral, rather than disengaged as in some prior art arrangements, so that the clutch throw-out bearing is unloaded much of the time, thereby extending its life. Other objects and advantages of the invention will hereinafter appear.

DRAWINGS

DESCRIPTION OF A PREFERRED EMBODIMENT

Figure 1:
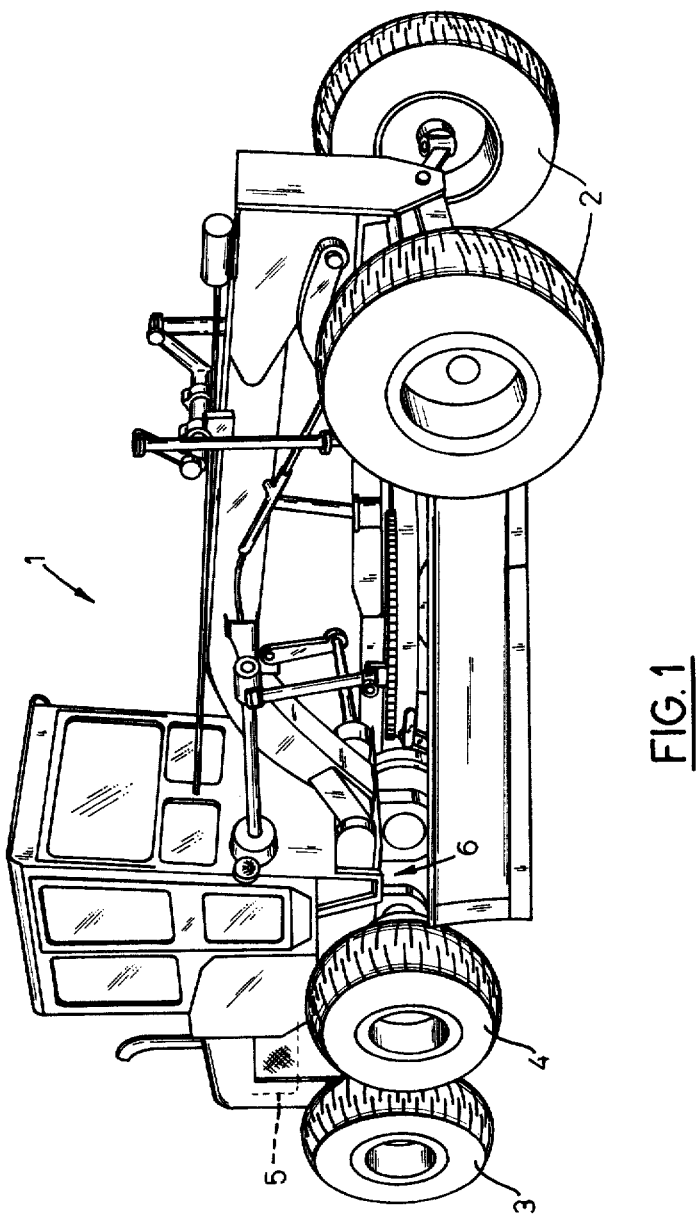
FIG. 1 is a perspective view of a machine such as a motor grader employing a power train and a control system therefor in accordance with the invention.

Referring to FIG. 1, the numeral 1 designates a vehicle or machine such as a motor grader having a pair of steerable front wheels 2, a pair of rear drive wheels 3 (only one of which is shown), a pair of front drive wheels 4 (only one of which is shown), an internal combustion engine 5, and a power train assembly 6 for transmitting motive power from engine 5 to the drive wheels 3 and 4.

Figures 2, 3:
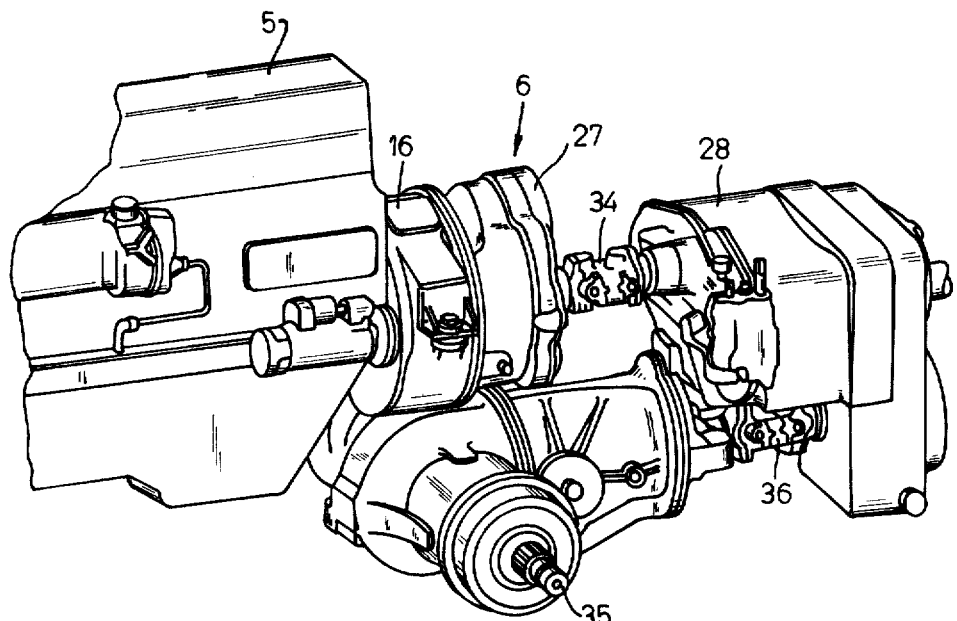
FIG. 2 is a perspective view showing the engine, the main engine clutch, the range transmission, the main transmission and a drive axle of the machine of FIG. 1 and suitable for use with a control system in accordance with the invention.
FIG. 3 is a chart showing the transmission shift sequences.

Referring to FIG. 2, power train assembly 6 comprises a normally engaged main engine clutch 16 connected to engine 5, a hydraulically controlled two-speed (high-low) speed range transmission 27 connected to be driven by clutch 16 when the latter is engaged, a hydraulically controlled four-speed reversible main transmission 28 connected to be driven by range transmission 27 through a first universal joint 34, and a rear axle 35 for the drive wheels 4 connected to be driven by main transmission 28 through a second universal joint 36.

Figure 4:
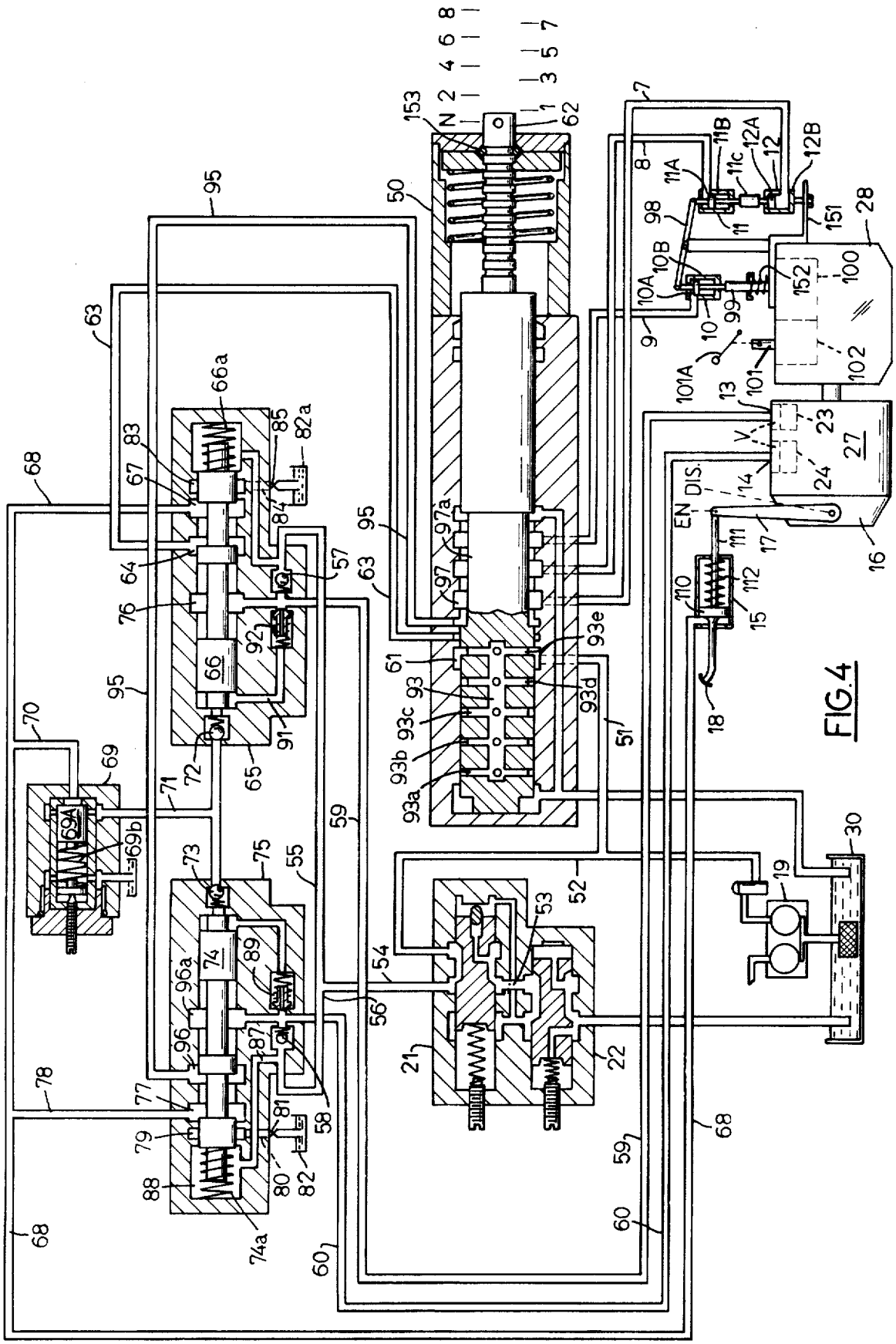
FIG. 4 is a schematic diagram showing portions of the control system in accordance with the invention.

Main engine clutch 16, range transmission 27 and main transmission 28 are controlled by a fluid logic control system, shown schematically in FIG. 4, which effects their operation in a predetermined sequence in response to operation of a manually operable axially movable selector spool 62 of a speed range control valve 50 to provide for rotation of drive shaft 35 in any one of eight speed ranges in either forward or reverse direction.

More specifically, as FIG. 4 shows, main engine clutch 16 is operated by a movable clutch control lever 17 which is actuatable automatically by a hydraulically operated clutch release cylinder 15 or manually by means of a clutch pedal 18. The range transmission 27 is shiftable by supplying hydraulic fluid to either of its two (low-high) power shift clutches 23 and 24. The main transmission 28 is shiftable into forward, reverse or neutral by manual operation of the spool 101 of a direction selector valve 102. The main transmission 28 is also shiftable into any one of its four speed ranges by operation of the spool 99 of a speed selector valve 100. The spool 99 of the speed selector valve 100 is movable axially by a hydromechanical linkage comprising three hydraulic shift cylinders 10, 11 and 12.

The fluid logic control system shown in FIG. 4 operates main engine clutch 16, the range transmission 27 and the main transmission 28 automatically in a predetermined sequence so as to provide eight speed ranges in either forward or reverse. THe control system comprises a source of hydraulic fluid, such as a pump 19; the speed range control valve 50; a high range shifter valve 75; a low range shifter valve 65; an engine clutch sequence valve 69; and pressure regulating valves 21 and 22. The shifter valves 75 and 65 and the sequence valve 69 operate in concert in response to manual operation of the selector spool 62 of control valve 50 to supply fluid to operate the engine clutch release cylinder 15 and the range transmission shift clutches 23 and 24. The three hydraulic shift cylinders 10, 11 and 12 are operated by selector valve 50. In accordance with the sequence, the normally engaged main engine clutch 16 is automatically disengaged while either of the transmissions 27 and 28 is undergoing a shifting operation so as to provide for smoother shifting and to relieve loads on the power shift clutches in the transmission. Furthermore, the range transmission 27 automatically shifts twice (high and low) in each of the four speed ranges of the main transmission 28 to provide a total of eight possible speed ranges.

The main engine clutch 16, one of the two power shift clutches 23, 24 in range transmission 27, and two of the six hereinafter described power shift clutches in main transmission 28 must be engaged simultaneously in order to transmit power from engine 5 to drive axle 35. The range transmission 27 shifts either to high or low each time spool 62 of selector valve 50 is moved one speed position, whereas each of the four power shift speed clutches in main transmission 28 remains engaged for two speed position changes of spool 62.

FIG. 3 is a chart depicting the transmission shift sequence and compares the position of the selector spool 62 with the conditions of the shifter clutches in the range transmission 27 and the main transmission 28 when the selector spool 62 is in neutral position or in any one of eight speed range positions during forward operation. The chart shows that range transmission 27 is inoperative when selector spool 62 is in neutral and subsequently operates in either low or high range as spool 62 is moved to each speed position. The chart also shows the sequence for the four main transmission shifter clutches for various selector spool positions. It is to be understood that clutch sequencing during reverse operation is similar to that depicted in the chart.

Range transmission 27, shown schematically in FIG. 4, is a conventional constant mesh power shift type transmission and has two power shift clutches 23 and 24 which are hydraulically applied (actuated) and spring-released and which are actuatable alternately by direct application of hydraulic fluid through hydraulic fluid lines 59 and 60, respectively, to clutch valves V associated therewith.

Figure 5:
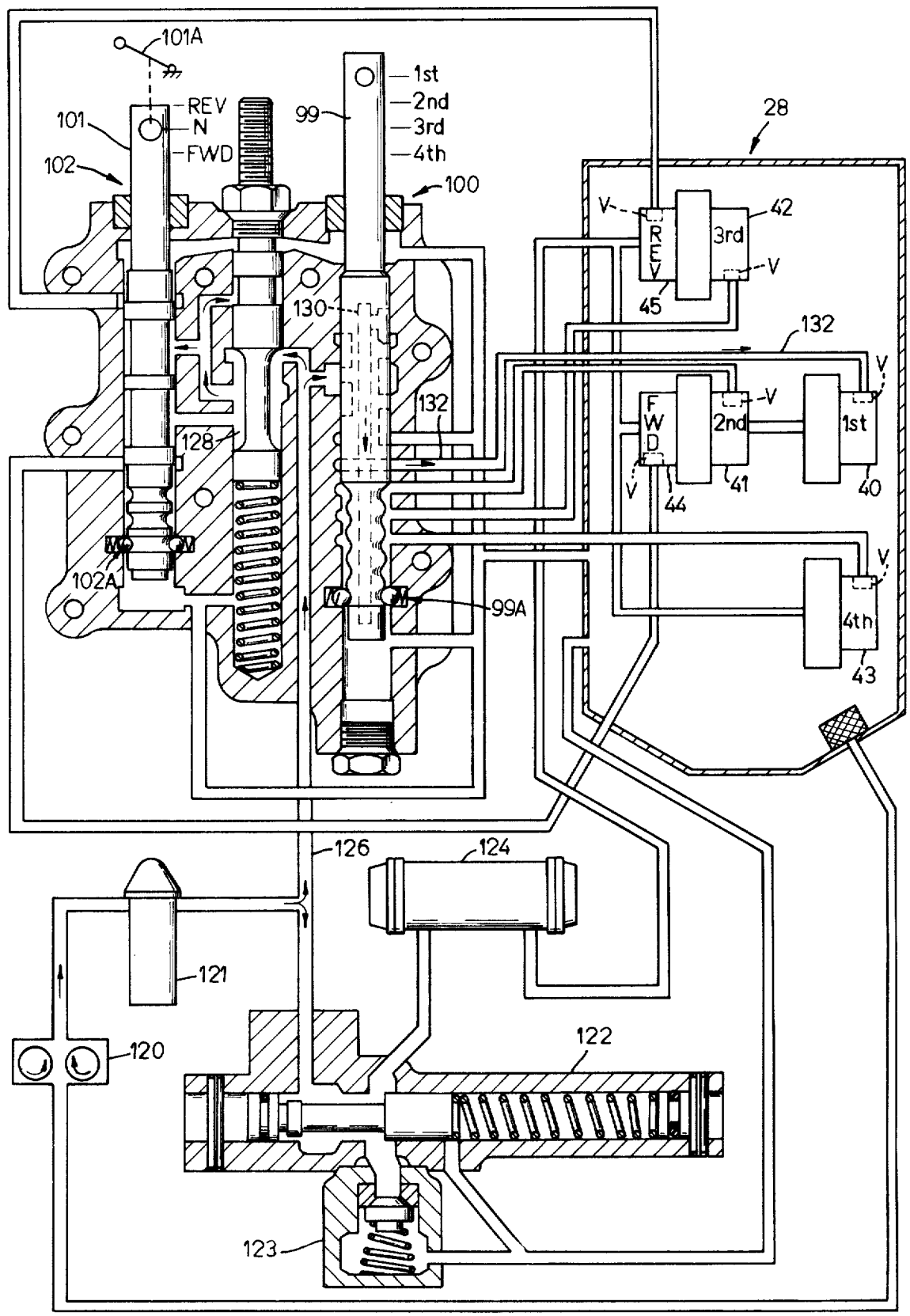
FIG. 5 is a schematic diagram showing the hydraulic circuitry of the main transmission and certain other portions of the control system in accordance with the invention.

Main transmission 28, shown schematically in FIG. 4 and in more detail in FIG. 5, is a conventional power shift type transmission and contains six power shift clutches, namely: four speed clutches 40, 41, 42 and 43; a forward clutch 44; and a reverse clutch 45. The first speed clutch 40 and the fourth speed clutch 43 are single clutches. Reverse clutch 45 and third speed clutch 42, and forward clutch 44 and second speed clutch 41 are duplex types. All six clutches of main transmission 28 are hydraulically applied (actuated) and springreleased and, when actuated, effect shifting of main transmission 28 into any one of its four speed ranges in either forward or reverse.

Each of the power shift clutches 23, 24, 40, 41, 42, 43, 44 and 45 is provided with a conventional transmission clutch valve designated V. It is to be understood that each clutch valve V prevents lube oil from partially engaging its associated clutch. When the associated clutch is disengaged, its clutch valve V is closed and pressure is equal in all parts of the clutch thereby allowing the springs (not shown) in the clutch to keep the clutch fully released. When a clutch is to engage, oil is supplied to open the clutch valve V to thereby move the clutch into engaged (actuated) position.

Referring to FIG. 5, the hydraulic control system for main transmission 28 is shown schematically to facilitate the understanding of the operation of the six shifter clutches in main transmission 28 in response to operation of the direction selector valve 102 and the speed selector valve 100. In FIG. 5 the direction selector spool 101 of valve 102 is shown in neutral position. The speed selector spool 99 of the valve 100 is shown in first speed range position wherein it actuates (engages) first speed clutch 40. As FIG. 5 shows, the hydraulic system for main transmission 28 comprises a main transmission fluid supply pump 120, and oil filter 121, a main pressure regulating valve 122, a safety relief valve 123 connected to regulating valve 122, and a heat exchanger 124. Since it is not feasible to illustrate all possible valve spool combinations and clutch combinations for the system shown in FIG. 5, the system is shown in a condition wherein the direction selector valve 102 is in neutral, the speed selector valve 100 is in first speed position and the first speed range clutch 40 is actuated, as hereinbefore noted. In the condition shown in FIG. 5, when the system is in neutral, oil from pump 120 flows through filter 121, through line 126 to a passage 128 in the common housing for valves 100 and 102. Oil in passage 128 deadheads against direction selector spool 101 which is shown in neutral position. However, since speed selector spool 99 is indexed to the first speed position, oil flows from passage 128, through a passage 130 in the spool 99, and through a clutch supply line 132 to engage the first speed clutch 40. Thus, the first speed clutch 40 is always engaged when the system is in neutral. The arrows in FIG. 5 show the oil flow for the aforedescribed condition. It is to be understood that, as speed selector spool 99 is axially moved downward from the position shown, the other speed range clutches would be actuated in the appropriate sequence. Furthermore, if direction selector spool 101 is moved axially from neutral into either forward or reverse positions, the forward and reverse clutches 44 and 45, respectively, would be brought into play.

Main engine clutch 16, shown schematically in FIG. 4, is a conventional spring-loaded multiple disc type normally engaged clutch which is controlled by the movable clutch operating lever 17. Clutch 16, which disengages when lever 17 is moved to the right in FIG. 4, can be manually disengaged by depressing clutch pedal 18, or can be automatically disengaged hydraulically by operation of engine clutch release cylinder 15. Cylinder 15 contains a piston 110, a piston rod 111 and a biasing spring 112 acting against the piston. The spring 112 is extended to effect engagement of main engine clutch 16 and is compressed when the clutch is disengaged. Clutch 16 can be disengaged by depressing clutch pedal 18 to move piston 110 and rod 111 rightward or by moving piston 110 by means of oil from the range clutch shifter valves 65 and 75. Clutch 16 disengages automatically each time selector spool 62 is operated to cause a shift, i.e., by pressurization of cylinder 15 just prior to operation of the power shift clutches during a shifting operation, and clutch 16 does not re-engage until the power shift clutches in the transmissions 27 and 28 have completed shifting.

Referring to FIGS. 4 and 5, the selector valves 100 and 102 may be combined in the same valve housing and built into the main transmission 28. Direction selector valve 102 includes the direction selector spool 101 which is axially movable by manually operable direction selector lever 101A. As FIG. 4 shows, the speed selector valve 100 includes the speed selector spool 99 which is axially movable by the hydromechanical linkage comprising the three hydraulic shift cylinders 10, 11 and 12 which have a combination of four output positions corresponding to the four speed ranges of main transmission 28. As FIG. 4 shows, shift cylinder 10 is carried on spool 99 and its piston 10A is connected thereto. The housing 10B of shift cylinder 10 is pivotally connected to one end of a beam 98 which is pivotally supported on transmission 28. The housing 11B of shift cylinder 11 is pivotally connected to the other end of beam 98. The piston 11A of shift cylinder 11 is connected by a rod 11C to the piston 12A of shift cylinder 12 and the housing 12B of shift cylinder 12 is rigidly secured to a bracket 151 on transmission 28. Hydraulic fluid lines 9, 8 and 7 connect the cylinders 10, 11 and 12, respectively, to the speed control valve 50 which is shown in neutral position in FIG. 4. The three cylinders 10, 11 and 12 control movement of speed selector spool 99 in valve 100. When a shift is made, oil from control valve 50 pressurized one or more of the shift cylinders 10, 11 or 12 to move the speed selector spool 99 to a desired position. One shift cylinder 12 must be pressurized to engage the second clutch 41, two cylinders 12 and 11 must be pressurized to engage the third clutch 42, and all three cylinders 12, 11 and 10 must be pressurized to engage the fourth clutch 43. When a downshift is made, oil in the pressurized cylinders is directed to sump, and spring 152 returns the speed selector spool 99 to the position for the lower speed selected. Direction selector valve spool 101 is axially movable to three positions to shift main transmission 28 into neutral, forward or reverse. The speed range selector spool 62 of valve 50 is axially movable to eight speed positions and to neutral, to operate the linkage and thereby actuate the speed selector spool 99 of main transmission control valve 100 to effect shifting of main transmission 28 into any one of four speed ranges. The range selector spool 62 also effects operation of main engine clutch 16 and transmission 27 in a predetermined sequence, as hereinafter explained.

Referring to FIG. 4, the fluid logic control system is seen to comprise a source of hydraulic fluid such as pump 19, high and low range clutch shifter valves 75 and 65, respectively, the engine clutch sequence valve 69, a pressure regulator valve 21 and a pressure relief valve 22.

Pump 19, which may be physically mounted on range transmission 27 and driven by engine 5 through an accessory drive gear (not shown) in range transmission 27, draws oil from a sump 30, which may be physically located in the housing for axle 35 shown in FIG. 2 to supply hydraulic fluid for the fluid logic control system.

The range clutch shifter valves 65 and 75, which may be physically located on range transmission 27, operate the high-low clutches 24 and 23 and cylinder 15. The valves 65 and 75 comprise spools 66 and 74, respectively, which direct oil from valve 50 to engage the range shifter clutches 24 and 23, respectively. The shifter valves 65 and 75 work together with engine clutch sequence valve 69 to automatically disengage and re-engage main engine clutch 16 each time a range shift is made.

The engine clutch sequence valve 69, which may be physically mounted on range transmission 27, comprises a spool 69A to regulate the pressure of the oil which is delivered to cylinder 15 to disengage main engine clutch 16 and this oil reacts on the ends of the shifter valve spools 66 and 74 when a range shift is made. The purpose of sequence valve 69 is twofold: to assure disengagement of main engine clutch 16 until a shift in the range transmission 27 is completed and to assure that the pressure of the oil delivered to the shifter valves 65 and 75 is high enough to activate the spools thereof and thereby allow oil flow to the range clutches 23 and 24. The fluid lines interconnecting the components in the fluid logic control system and the mode of operation of the components are hereinafter described in detail.

As FIG. 4 shows, the speed range control valve 50 comprises a housing within which an axially movable spool 62 is arranged. Spool 62, which is shown in neutral position, is axially movable outward manually to any one of eight speed positions, being held in a selected position by a detent 153. Spool 62 is provided with a groove 97a which cooperates with the housing to define a chamber or passage 97. Chamber 97 communicates with the shift cylinders 12, 11 and 10 by means of the fluid lines 7, 8 and 9, respectively. When spool 62 is in neutral, as shown, there is no fluid flow from valve 50 to the cylinders 10, 11 and 12. Spool 62 is also provided with an axially disposed, centrally located passage 93 having five radially extending passages 93a, 93b, 93c, 93d and 93e. When valve 50 is in neutral fluid is supplied from pump 19 through line 51 to passage 93, but is deadheaded thereat. It is to be understood, for example, that when spool 62 is moved from neutral to its first or second speed positions the radial bore 93e still does not effect communication between line 51 and line 7. Thus, no fluid is supplied to cylinder 12 in neutral, first or second speed. Consequently, as the chart in FIG. 3 shows, main transmission 28 remains in its first speed range. However, if spool 62 is moved to its third or fourth speed point, passage 93a would be in communication with line 7 and shift cylinder 12 would be actuated to shift main transmission into second speed range. Similarly, if spool 62 is moved to fifth or sixth positions, then passage 93e would supply fluid to lines 7 and 8 to operate shift cylinders 12 and 11 and shift main transmission 28 to its third speed range. Similarly, when spool 62 is moved to seventh and eighth positions all the fluid lines 7, 8 and 9 would be pressurized and shift cylinders 12, 11 and 10 would operate to shift the main transmission 28 into its fourth speed range.

The passages radially extending from passages 93 in spool 62 also supply fluid to the lines 63 and 95. As FIG. 4 shows, the space between the connection ports for the lines 63 and 95 is one-half the distance of the spacing between each pair of radially extending passages 93a through 93e. Consequently, as spool 62 is moved axially to its various speed positions, the lines 63 and 65 will be pressurized alternately and, as a consequence, the range shifter valves 65 and 75 will be supplied alternately.

Low range shifter valve 65 comprises a housing in which a spool 66 is disposed for axial movement. Spool 66 is normally biased to the position shown by means of spring 66a wherein the passages 64 and 67 in valve 65 are in communication. Spool 66 is shiftable to another position wherein communication between passages 64 and 67 is closed and wherein passage 64 is placed in communication with passage 76 so as to supply fluid from line 63 to line 59 to operate the range shifter clutch 23. Axial displacement of spool 66 against its biasing spring is effected by supplying fluid through a check valve 72 from fluid line 71 when the sequence valve 69 is open.

High range shifter valve 75 comprises a housing in which a spool 74 is disposed for axial movement. Spool 74 is normally biased to the position shown by means of spring 74a wherein the passages 77 and 96 in valve 75 are in communication. Spool 74 is shiftable to another position wherein communication between passages 77 and 96 is closed and wherein passage 96 is placed in communication with a passage 96a so as to supply fluid from line 95 to line 60 to operate the high range shifter clutch 24. Axial displacement of spool 74 against its biasing spring 74a is effected by supplying fluid through a check valve 73 from fluid line 71 when the sequence valve 69 is open.

Sequence valve 69 comprises a valve housing and an axially movable valve spool 69A which is normally maintained in closed position by means of a biasing spring 69b. When sequence valve 69 is biased closed, fluid flow between lines 70 and 69 is interrupted. Spool 69A shifts to open position in response to determined pressure being applied thereto from lines 70 and 68 when low range shifter valve 65 has its spool 66 biased to closed position, as shown in FIG. 4.

Referring now to FIGS. 4 and 5, the operation of the system is generally described as follows. Assume that the system is in neutral, as shown in FIGS. 4 and 5. In neutral condition selector valve 50 is in neutral, sequence valve 69 is closed, the range shifter valves 65 and 75 are in the condition shown in FIG. 4, the clutch cylinder 15 is depressurized and main engine clutch 16 is engaged. In this condition range transmission clutches 23 and 24 are in neutral because neither of the range clutches 23 or 24 is pressurized for operation, although they both receive low pressure lubricating oil through the lines 59 and 60. It is to be understood that main transmission 28 has its first speed clutch 40 engaged because speed selector valve 100 is in first speed position, but direction selector valve 102 is in neutral, as shown in FIG. 5. Directional control of main transmission 28 is controlled by speed selector valve 102.

As spool 62 of speed control valve 50 is moved from neutral to first speed position, the effect is to automatically disengage main engine clutch 16, then automatically engage low range shifter clutch 23, and then automatically re-engage main engine clutch 16. First speed clutch 40 of main transmission 27 remains engaged. In this condition the transmission system is operating at a first speed.

As the spool 62 of speed control valve 50 is moved from first speed to second speed, the effect is to disengage clutch 16, de-energize low range shifter clutch 23 and energize high range shifter clutch 24, and then automatically re-engage main clutch 16. First speed clutch 40 of main transmission 28 remains engaged. In this condition the transmission system is operating at a second speed.

As the spool 62 of speed control valve 50 is moved from second speed to third speed, the effect is to disengage clutch 16, de-energize high range shifter clutch 24 and re-energize low range shifter clutch 23, shift the main transmission 28 from its first speed range to its second speed range by operating second speed clutch 41, and automatically re-engage main clutch 16. In this condition the transmission system is operating at a third speed.

This process of automatic disengagement of the main engine clutch 16, shifting of the range transmission 27 between high and low range, shifting of main transmission 28 from one speed range to another (only after the range transmission has shifted twice), and automatic re-engagement of main engine clutch 16 after both transmissions 27 and 28 have shifted is repeated in accordance with the sequence shown in the chart in FIG. 3 as speed control valve 50 is moved in sequence through its eight speed positions. It is to be understood that this sequence is followed whether the system is being operated in forward, as depicted in FIG. 3, or in reverse.

It is to be understood in connection with the remaining portion of the description of operation that the shifter valves 65 and 75 control the operation of the range clutches 23 and 24 of range transmission 27 and operation of clutch cylinder 15 for main engine clutch 16. Furthermore, as will hereinafter appear, actuation of the range clutches 23 and 24 is carried out by high pressure fluid or oil (at 180 p.s.i., for example) and that the shifter valves 65 and 75 also direct low pressure fluid or oil to the range clutches 23 and 24 for lubrication purposes under certain circumstances. It is also to be understood that speed control valve 50 directly controls pressurization of the shift cylinders 10, 11 and 12 in combinations appropriate to effect shifting of main transmission 28 to any one of its four speed ranges, as hereinbefore described.

Figure 6:
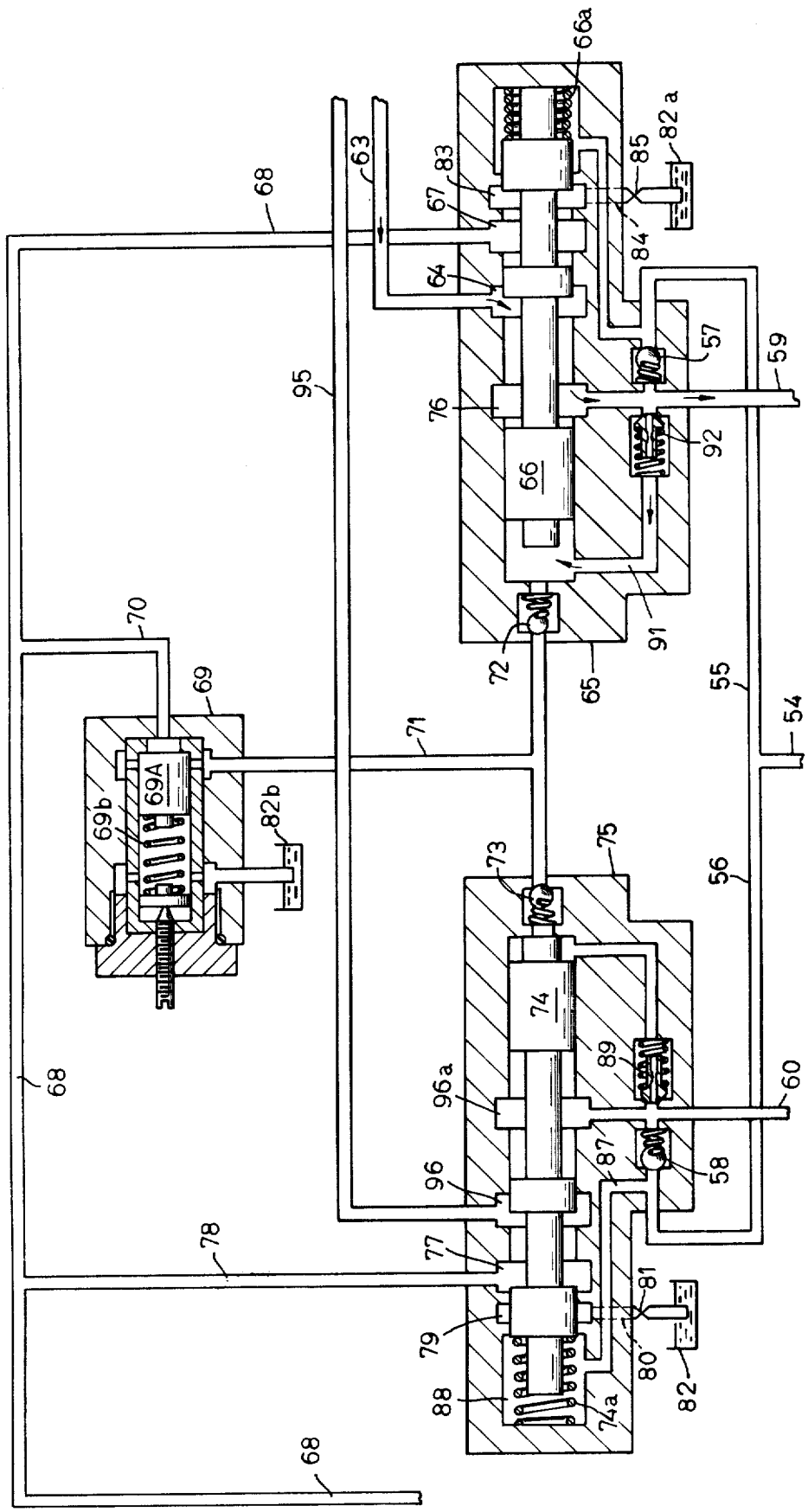
FIG. 6 is a portion of the schematic diagram of FIG. 4 and shows certain valves in condition for operation in first speed.
Figure 7:
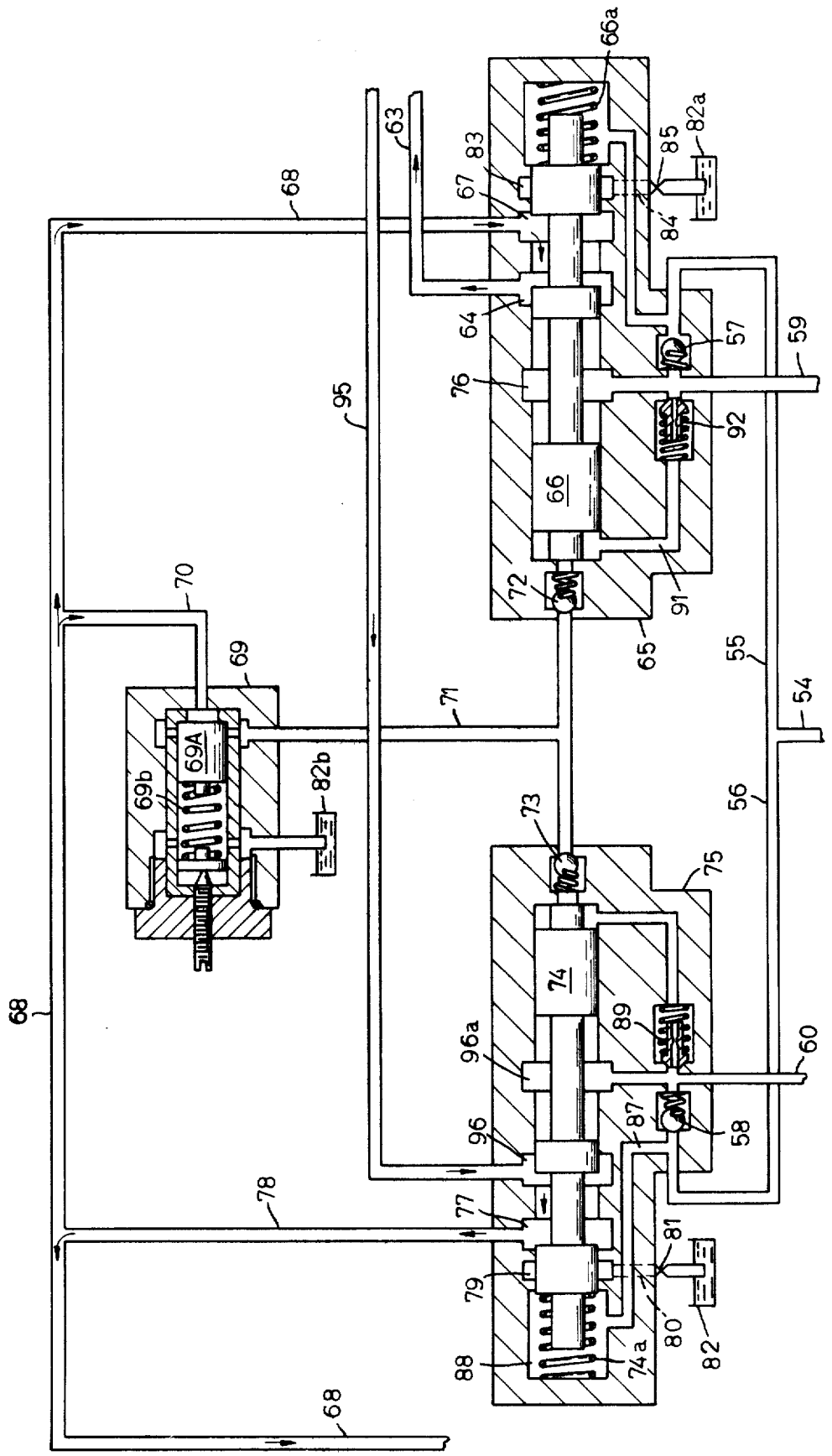
FIG. 7 is similar to FIG. 6 and shows the said valves in condition for low range clutch and engine clutch disengagement.
Figure 8:
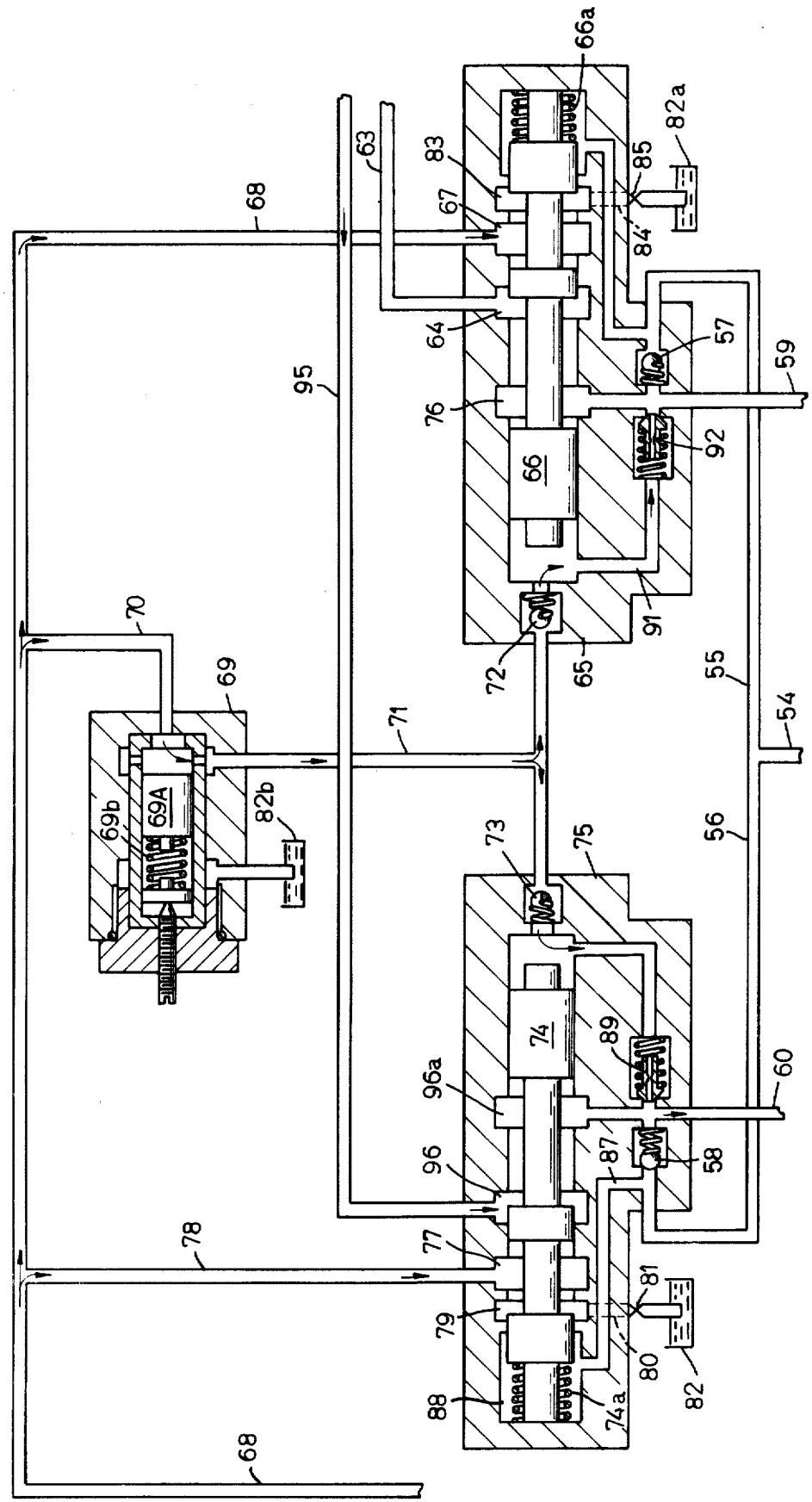
FIG. 8 is similar to FIG. 6 and shows the said valves in condition for high range clutch and engine clutch engagement.
Figure 9:
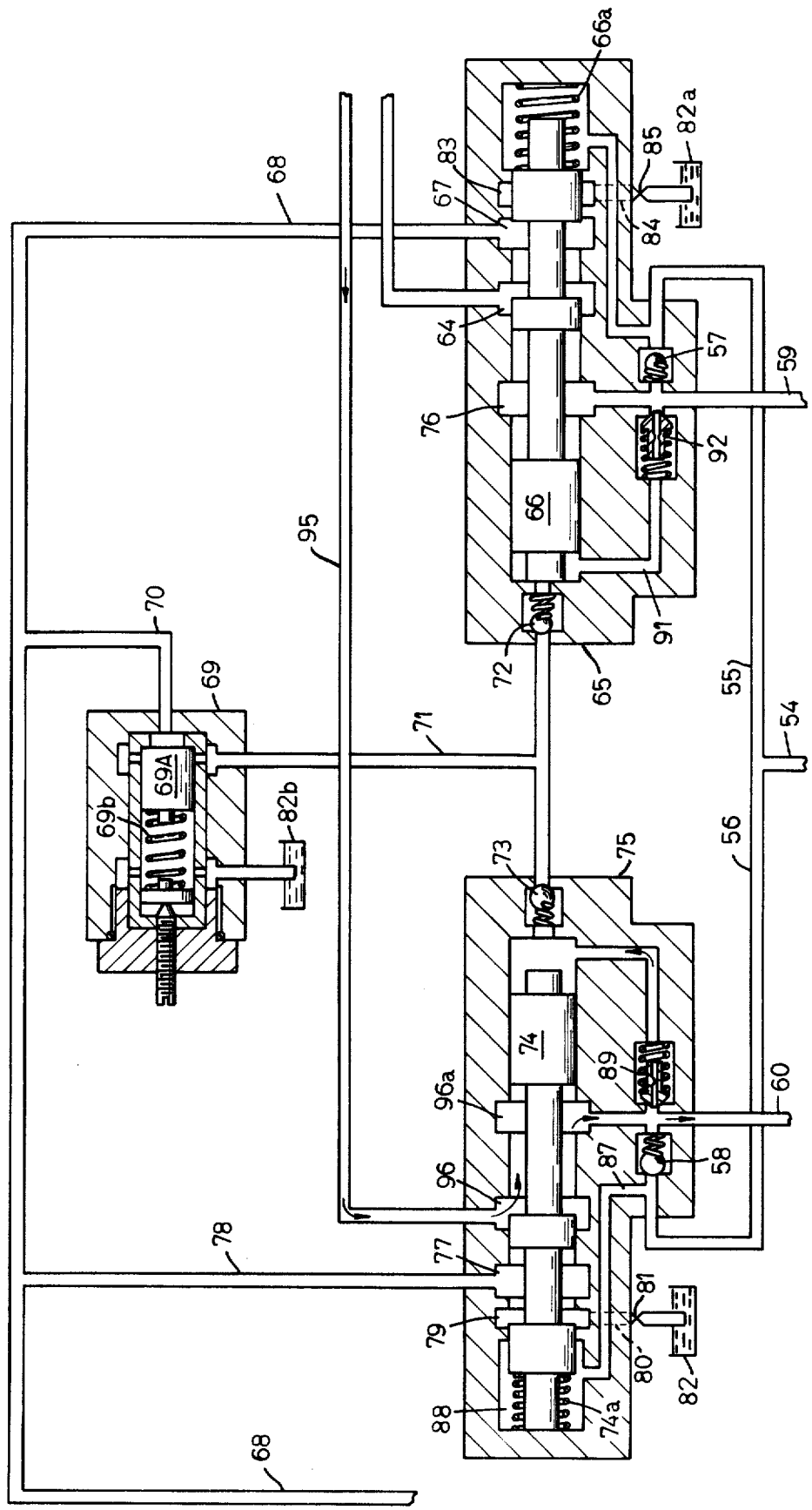
FIG. 9 is similar to FIG. 5 and shows the said valves in condition for operation in second speed.

With respect to FIGS. 6, 7, 8 and 9, they depict various operating positions of sequence valve 69 and the range clutch shifter valves 65 and 75. FIG. 6 shows system operation in first speed. FIG. 7 shows system operation with the low range shifter clutch 23 disengaged and main engine clutch 16 disengaged. FIG. 8 shows system operation with the high range shifter clutch 24 engaged and main engine clutch 16 engaged. FIG. 9 shows system operation in second speed.

Referring again to FIGS. 4 and 5, the operation of the system is described in more detail as follows. Assume that spool 62 of valve 50 is in neutral, as shown in FIG. 4, and that sequence valve 69 and the shifter valves 65 and 75 are in the condition shown. The main transmission 28 is in first gear, as shown in FIG. 5, the main engine clutch 16 is engaged and the range clutches 23 and 24 are disengaged.

Pump 19 supplies oil through line 51 to control valve 50 and through line 52 to main pressure regulating valve 21 which serves to regulate the pump pressure in lines 51 and 52 at 180 p.s.i., for example. A portion of fluid flow from pump 19 is released through a passage 53 to relief valve 22 which serves to regulate the pressure in passage 53 and in a line 54 at 20 p.s.i., for example. Oil in line 54 is divided and flows through lines 55 and 56 through check valves 57 and 58, respectively, into lines 59 and 60, respectively. The oil, at 20 p.s.i., is for lubrication and is directed to the clutches 23 and 24 in the range transmission 27 through lines 59 and 60 at the ports 13 and 14, respectively, for lubrication during the periods that these clutches are disengaged. With control valve 50 in neutral position, the oil in line 51 and chamber 61, at 180 p.s.i., is blocked by spool 62 of valve 50.

Before shifting from neutral to first speed, clutch pedal 18 is depressed to manually disengage engine clutch 16. This will override hydraulic control of clutch 16, thereby allowing the machine operator to control initial movement of grader 1. Then, the speed control spool 62 of valve 50 is moved to first speed (in either forward or reverse direction) to engage the low range clutch 23 in range transmission 27, then the main engine clutch 16 is slowly re-engaged to place grader 1 in motion.

By shifting the selector valve spool 62 to first speed position, a passage is opened between chamber 61 in valve 50 and a line 63 which connects to chamber 64 of low range shifter valve 65. The spring biased position of spool 66 of low range shifter valve 65, shown in FIG. 4, allows the oil to pass to chamber 67 of shifter valve 65 and from there through a line 68 to the clutch cylinder 15.

If clutch 16 were not manually overridden, actuation of cylinder 15 to disengage the main engine clutch 16 would occur prior to engagement of low range shifter clutch 23 in range transmission 27 because the sequence valve 69 is closed, as shown in FIG. 4, when the system is in neutral, and needs to be supplied by oil from line 68 through line 70 before it can open. Sequence valve 69, when closed, assures that pressurized fluid (at 120 p.s.i., for example) is applied to cylinder 15 to disengage clutch 16 before the oil is permitted to enter line 71 (when sequence valve 69 opens) and pass through the check valves 72 and 73 to displace the spool 66 in low range shifter valve 65 to the right and to displace the spool 74 of high range shifter valve 75 to the left, as shown in FIG. 8.

As FIG. 6 shows, the new position assumed by spool 66 of low range shifter valve 65 simultaneously opens a passage in low range shifter valve 65 between the chambers 64 and 76 thereof for 180 p.s.i. oil to enter line 59 and flow therethrough to the low range clutch 23 in range transmission 27 to engage it. Spool 66 also cuts off any additional oil flow between chambers 64 and 67 of valve 65, as FIG. 8 shows.

Also, simultaneously, the new position assumed by spool 74 in high range shifter valve 75 has opened chamber 77 to receive oil from line 68 through branch line 78 to chamber 79 and line 80 including an orifice 81 to tank 82. The purpose of oirfice 81 is to assure that bleeddown of the pressure in line 68 and spring engagement of main engine clutch 16 does not occur prior to engagement of low range clutch 23 in range transmission 27. Similar bleed-down of line 68 also occurs in low range shifter valve 65 from chamber 67 to chamber 83 to line 84 through orifice 85 to tank 82a. The pressure drop in line 68 eliminates flow of oil through line 70 and sequence valve 69 because valve 69 closes. Pressure in line 71 also drops because of a bleed hole in a check valve 89 and passage which allows communication with line 60. Line 60 is subjected to 20 p.s.i. pressure from line 56 through check valve 58.

As FIG. 6 shows, during operation in first speed, this 20 p.s.i. pressure is acting on the right hand end of spool 74 and is balanced by the same 20 p.s.i. acting from line 56 through line 87 on the left hand end of spool 74. Spring 88 forces spool 74 to the right and neutralizes shifter valve 75. Valve spool 66 in shifter valve 65 is held in the position to the right by 180 p.s.i. pressure applied on its left end by reason of passage 91, check valve 92 and closed check valve 72.

In shifting speed control valve 50 from first to second points in the same direction (forward or reverse), similar action occurs, except that the functions of shifter valves 65 and 75 are alternated, as comparison of FIGS. 6 and 9 shows. In addition, 180 p.s.i. pressure in chamber 61 is delivered through appropriate passages 93 in spool 62 to line 95, chamber 96, chamber 77, line 78, line 68 to clutch cylinder 15 to cause the main engine clutch 16 to disengage and to sequence valve 69. The alternate action of shifter valves 65 and 75 causes the low range clutch 23 to disengage, the high range clutch 24 to engage and main engine clutch 16 to re-engage. During this time main transmission 28 remains in its original first gear condition.

Oil flow through the shifter valves 65 and 75 when shifting from first speed to second speed is typical of the function of the valves any time a range shift is made. For example, referring to FIG. 6, when operating in first speed, the low range clutch 23 is engaged. The low range shifter valve 65 is open allowing flow of high pressure oil to keep low range clutch 23 engaged. High range shifter valve 75 is closed, allowing flow of lube oil to the high range clutch 24. The engine clutch sequence valve 69 is closed becuase there is no oil flow or pressure in this circuit.

Referring to FIG. 7, when the high pressure oil flow to low range shifter valve 65 is blocked at the control valve 50, spring tension closes the shifter valve 65 and the low range clutch 23 disengages. High pressure oil flows through the high range shifter valve 75 to the engine clutch release cylinder 15. Engine clutch 16 disengages. Disengagement of the clutches 23 and 16 occurs almost simultaneously. Engine clutch sequence valve 69 remains closed until engine clutch release oil reaches specified pressure.

Referring to FIG. 8, when sequence valve 69 opens, sequence pressure opens both shifter valve spools 66 and 74. High pressure oil flows through high range shifter valve 75 to engage high range clutch 24. The oil pressure also holds the valve spool 66 open. Movement of both shifter valve spools 66 and 74 stops flow of high pressure oil through line 68 to the engine clutch release cylinder 15. Oil in the valves 75 and 65 returns to the sumps 82 and 82A through the orifices 81 and 85, respectively, in each shifter valve 75 and 65, allowing main engine clutch 16 to engage. The orifices 81 and 85 retard the flow of oil to the sumps to ensure that the main engine clutch 16 engages after the range clutch 23 or 24.

Referring to FIG. 9, depicting operation in second speed, when sequence pressure drops, spring tension closes spool 69A of the sequence valve 69 and the spool 66 of the low range shifter valve 65. High pressure oil continues to flow through the high range shifter valve 75, keeping high range clutch 24 engaged. There is no oil flow or pressure in line 68 for the engine clutch release cylinder 15.

When the spool 62 of selector valve 50 is shifted from second to third speed position (assuming operation in the same direction) the functions of shifter valves 65 and 75 again alternate and perform as they did for the first speed selection. In addition, the 180 p.s.i. oil delivered to line 63 is also directed through the appropriate passages 93 of spool 62 to chamber 97 through line 7 to actuate cylinder 12. Extension of this cylinder acts through lever 98 and retracted cylinders 10 and 11 to shift the valve spool 99 of four speed transmission 28 to second gear.

In shifting from first speed forward to first speed reverse, the main engine clutch 16 disengages, the forward clutch 44 of main transmission 28 disengages, the low range clutch 23 of range transmission 27 disengages, and the reverse clutch 45 of main transmission 28 engages. However, in reversing, it is desirable to stop forward motion of grader 1 before completing the shift, i.e., before the low range clutch 23 re-engages and the engine clutch 16 re-engages.

I claim:
1. In combination:
a power train comprising a normally engaged clutch, a high and low range transmission and a multispeed main transmission;
first, second and third hydraulically operable means for operating said clutch, range transmission and main transmission, respectively;
a source of hydraulic fluid;
and hydraulic control means, including a selectively operable control valve for operating said first, second and third hydraulically operable means in a predetermined sequence in response to operation of said control valve to effect operation of said first means and disengagement of said clutch for an interval of time during which either said second or third hydraulically operable means are effecting shifting of their respective transmissions, said control valve comprising a valve spool selectively movable to a plurality of speed positions; said first means comprising a hydraulic clutch cylinder; said second means comprising hydraulically operable high and low range shifter clutches; and said third means comprising a speed selector valve for said main transmission and a linkage comprising a plurality of hydraulic shift cylinders for operating said speed selector valve; said control valve being operable to control fluid flow from said source to said clutch cylinder, to said high and low range shifter clutches, and to said hydraulic shift cylinders.

2. A combination according to claim 1 wherein said hydraulic control means further includes a sequence valve, a high range shifter valve and a low range shifter valve, said sequence valve and range shifter valves being cooperable in response to selective operation of said control valve to control fluid flow to said clutch cylinder and said range shifter clutches; and wherein said control valve directly controls fluid flow to said shift cylinders of said linkage.

3. A combination according to claim 2 wherein said shift cylinders of said linkage are operable in predetermined combinations in response to the position of said valve speed to effect operation of said speed selector valve in a predetermined manner.

4. In combination:
a power train comprising a normally engaged clutch, a high and low range transmission and a multispeed main transmission, said tramsmissions normally being shiftable independently of each other;
first, second and third hydraulically operable means for operating said clutch; range transmission and main transmission, respectively;
a source of hydraulic fluid;
and hydraulic control means, including a control valve selectively movable to a plurality of speed points for operating said first, second and third hydraulically operable means in a predetermined sequence in response to operation of said control valve to effect operation of said first means and disengagement of said clutch for an interval of time during which either said second or third hydraulically operable means are effecting shifting of their respective transmissions in response to operation of said control valve, said control valve being operable when moved between any two adjacent speed points to effect a shifting operation of said range transmission, said control valve being further operable when moved between certain adjacent speed points to maintain said main transmission in a selected speed range, said control valve also being operable when moved between certain other adjacent speed points to cause said main transmission to shift between two different speed ranges.

5. In a transmission system:
a normally engaged clutch;
a range transmission connected to be driven by said clutch when the latter is engaged and being shiftable between high and low ranges;
a main transmission connected to be driven by said range transmission and being shiftable to a plurality of speed ranges;
and control means operatively connected to said clutch, said range transmission and said main transmission and including a speed range selector valve having a valve spool selectively movable to any one of a plurality of speed positions,
said control means being operable in response to movement of said valve spool to one of its positions to shift said range transmission into either high or low range, said control means being further operable in response to movement of said valve spool to shift said main transmission from one speed range to another or to maintain said main transmission in said one speed range, depending on the position of said valve spool,
said control means being further operable in response to movement of said valve spool to disengage said clutch for an interval of time during which either transmission undergoes shifting and to re-engage said clutch thereafter, said control means further comprising a sequencing valve, a high range shifter valve and a low range shifter valve for effecting shifting operation of said range transmission and operation of said clutch in response to movement of said valve spool and wherein shifting operation of said main transmission is effected by movement of said valve spool.

6. A transmission system according to claim 5 including a clutch cylinder for operating said clutch, a linkage including a plurality of shift cylinders for shifting said main transmission, said shift cylinders being operable by said speed range selector valve, and wherein said range transmission includes high range and low range shifter clutches operable by said shifter valves.

7. In a transmission system:
a normally engaged clutch;
a clutch cylinder for operating said clutch;
a range transmission connected to be driven by said clutch when the latter is engaged and being shiftable between high and low ranges;
hydraulically operable range shifter clutches for operating said range transmission;
a main transmission connected to be driven by said range transmission and being shiftable to a plurality of speed ranges and to neutral;
a linkage comprising a plurality of shift cylinders for operating said main transmission;
and control means for operating said clutch, said range transmission and said main transmission, said control means comprising a speed range selector valve having a valve spool selectively movable to any one of a plurality of speed positions,
said control means further comprising a sequencing valve and a pair of range shifter valves for effecting operation of said range shifter clutches and said clutch cylinder,
said control means being operable in response to movement of said valve spool to one of its positions to operate said range shifter valves and said sequencing valve to shift said range transmission into either high or low range, to operate said shift cylinders to shift said main transmission from one speed range to another or to maintain said main transmission to said one speed range, depending on the position of said valve spool,
and to operate said clutch to disengage said clutch for an interval of time during which either transmission undergoes shifting and to re-engage said clutch thereafter.

8. In a hydraulic control system for operating a normally engaged main engine clutch, a range transmission adapted to be driven by said main engine clutch when the latter is engaged and shiftable into high and low speed ranges, and a main transmission adapted to be driven by said range transmission, said main transmission being shiftable into a plurality of speed ranges, in combination:
a hydraulically operated engine clutch cylinder for operating said main engine clutch;
a hydraulically operated high range clutch for shifting said range transmission into high range;
a hydraulically operated low range clutch for shifting said range transmission into low range;
a linkage including a plurality of hydraulically operated shift cylinders for shifting said main transmission;
a pump for supplying hydraulic fluid;
a high range shifter valve and a low range shifter valve for operating said high range clutch and said low range clutch, respectively, and for effecting operation of said engine clutch cylinder;
a speed range selector valve connected to said pump and having a valve spool selectively movable to any one of a plurality of speed positions, said selector valve controlling fluid flow to said shifter valves and to said shift cylinders;
and a sequencing valve for effecting operation of said shifter valves in a predetermined sequence in response to operation of said selector valve, said hydraulic control system being operable in response to movement of said valve spool to one of its positions to operate said shifter valves to shift said range transmission into either high or low range, and to operate said main engine clutch cylinder to operate said main engine clutch, said movement of said valve spool effecting operation of said shift cylinders to shift said main transmission from one speed range to another or to maintain said main transmission in said one speed range, depending on the position of said valve spool,
said hydraulic control system being further operable in response to said movement of said valve spool, to effect operation of said main engine clutch cylinder so as to disengage said main engine clutch for an interval of time during which either transmission undergoes shifting and to re-engage said main engine clutch thereafter.

9. In combination:
a power train comprising a normally engaged clutch, a high and low range transmission and a multispeed main transmission, said transmissions normally being shiftable independently of each other;

first, second and third hydraulically operable means for operating said clutch, range transmission and main transmission, respectively;

a source of hydraulic fluid;

and hydraulic control means, including a selectively operable control valve for operating said first, second and third hydraulically operable means in a predetermined sequence in response to operation of said control valve to effect operation of said first means and disengagement of said clutch for an interval of time during which either said second or third hydraulically operable means are effecting shifting of their respective transmissions in response to operation of said control valve.

10. In a transmission system:

a normally engaged clutch;

a range transmission connected to be driven by said clutch when the latter is engaged and being shiftable between high and low ranges;

a main transmission connected to be driven by said range transmission and being shiftable to a plurality of speed ranges, said transmissions normally being shiftable independently of each other;

and control means operatively connected to said clutch, said range transmission and said main transmission and including a speed range selector valve having a valve spool selectively movable to any one of a plurality of speed positions, said control means being operable in response to movement of said valve spool to one of its positions to shift said range transmission into either high or low range, said control means being further operable in response to movement of said valve spool to shift said main transmission from one speed range to another or to maintain said main transmission in said one speed range, depending on the position of said valve spool, said control means being further operable in response to movement of said valve spool to disengage said clutch for an interval of time during which either transmission undergoes shifting and to re-engage said clutch thereafter.

\* \* \* \* \*